May 18, 1965 — L. QUIJADA — 3,184,587
ILLUMINATED CONDIMENT SHAKER
Filed Nov. 23, 1962
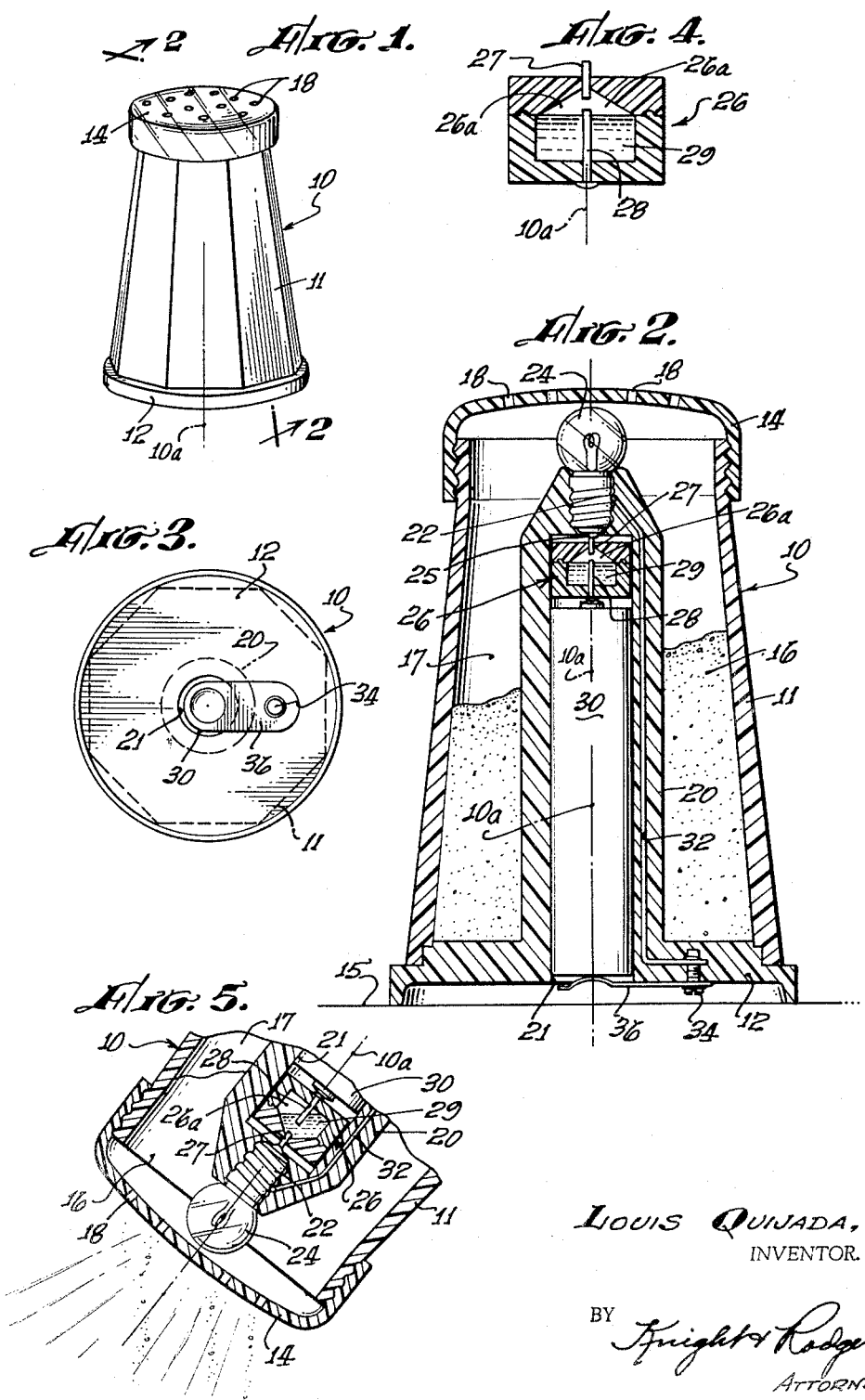
LOUIS QUIJADA, INVENTOR.
BY Knight & Rodgers
ATTORNEYS _United States Patent Office_

3,184,587
Patented May 18, 1965

3,184,587
ILLUMINATED CONDIMENT SHAKER
Louis Quijada, South Pasadena, Calif., assignor to
Mark W. Lee, South Pasadena, Calif.
Filed Nov. 23, 1962, Ser. No. 239,629
7 Claims. (Cl. 240—6.46)

The present invention relates generally to dispensers for powdered materials; and more particularly to shaker-type dispensers used at the table to shake salt, pepper or other flavorings or condiments onto food.

There are many restaurants, cocktail bars, and other eating establishments in which the general illumination level is low in order to provide a friendly, restful atmosphere. This makes it very difficult, and sometimes impossible, to see how much salt or other condiment is being dispensed from a shaker onto food. When the shaker has opaque walls, it is difficult to ascertain, without shaking some of the contents out, whether salt or pepper or other flavoring is contained within it and the rate at which the contents are coming out. This problem arises because at low light levels the color contrast between the condiment and the food is not sufficient for the former to be easily seen.

Thus, it is a general object of the present invention to provide a source of light associated with a shaker-type dispenser in such a way as to illuminate an area to which the condiment is being applied in order that the user may see the character of the condiment and the quantity being applied.

A further object of the invention is a novel arrangement of a shaker-type dispenser with a light contained therein and an automatic switch in the light circuit, whereby the light is illuminated when the shaker is in use.

These and other objects of the invention are achieved in a shaker-type dispenser by providing a hollow body containing a quantity of material to be dispensed; a socket inside the body adapted to receive a light and position the light adjacent a perforated wall section through which the material within the body is dispensed; the body being formed with a battery cavity which opens to the exterior of the body in order to permit insertion therein of a battery; and circuit means extending between the socket and the battery holding cavity to energize the socket for the purpose of lighting the light therein with electric current derived from the battery within the cavity.

In a preferred embodiment of the invention, the circuit means includes a position-responsive switch means which is normally open, thus de-energizing the circuit, when the dispenser is resting on a base portion of the body and which is closed, energizing the circuit, when the dispenser is tilted from the upright position to a dispensing position. While sufficient light for the purpose might under some conditions be transmitted through the perforations as the contents of the shaker passes through them, it is preferred that the wall of the shaker adjoining the dispensing perforations be light transmissive in character in order that light from the light bulb can pass through the wall to illuminate the food receiving the condiment from the shaker.

How the above objects and advantages of the invention, as well as others not specifically referred to herein, are attained will be more readily understood by reference to the following description and to the annexed drawing, in which:

FIG. 1 is a perspective view of a shaker-type dispenser embodying the present invention.

FIG. 2 is a vertical median section through the dispenser on line 2—2 of FIG. 1.

FIG. 3 is a bottom plan view of the dispenser of FIG. 1.

FIG. 4 is an enlarged vertical median view through the mercury type, position-responsive switch.

FIG. 5 is a fragmentary section similar to FIG. 2 showing the upper end of the shaker in the tilted dispensing position and the switch closed to complete the circuit.

Referring now to the drawing, and especially to FIGS. 1 and 2, it will be seen that the dispenser comprises a body indicated generally at 10. The body consists of three principal parts, tubular central section 11, base 12 attached to and closing the normally lower end of center section 11, and a removable perforated cap 14 which closes the upper end of the body. The body is here shown as being molded from a synthetic resin or plastic and it has been designed to make this molding operation simple and economical. However, it will be realized that the body may be made of other materials in which case the design may be altered suitably without departing from the spirit of the present invention.

Base 12 provides a portion of the body upon which the dispenser is adapted to rest in an upright position, that is with the axis 10a of the body extending upwardly from the surface 15 upon which the dispenser rests. The central section and the base may be cemented together or otherwise joined in any suitable manner when made in separate elements, as here. It is preferred that cap 14 has a screw threaded engagement with the upper end of the central section 11 in order to provide for easy removal of the cap to refill the dispenser when necessary. The screw thread provides a means for securing the cap in place so that it will not accidentally come off when in use.

Central section 11 is hollow and provides an interior space 17 within the body adapted to hold a quantity of a condiment 16, which for purposes of illustration may be considered to be salt, but without any necessary limitation thereto. The cap has a plurality of perforations 18, seen particularly in FIG. 2, through which the salt is dispensed by inverting and shaking the dispenser when in the inverted position of FIG. 5. For reasons which will become apparent, it is preferred that the cap be transparent or translucent in order to transmit a substantial amount of light through the area of the body wall immediately adjacent dispensing perforations 18.

Inside body 10 is hollow post 20 which extends upwardly from base 15 and is provided with internal cavity 21 which is open at its lower end to the underside of base 15. Post 20 is preferably integral with the base when the two are formed by a molding operation; but it will be realized that it can be a separate member joined to the base in any suitable manner.

At the upper end of post 20 is embedded light socket 22 of a size to receive a standard flashlight bulb 24. The socket is mounted at the upper end of the post in order to position light 24 closely adjacent the perforated section of the body wall, which is also light transmissive in order for light to pass through this section of the wall and also through perforations 18 therein.

Since it is well known that salt attracts moisture and then becomes corrosive to many metals, it is preferable that the upper end of post 20 be extended upwardly around socket 22 in order that the post can substantially engage the glass envelope of light bulb 24 in such a manner as to exclude contact of the metallic parts of the socket and the base of the light bulb with any grains of salt which might otherwise pass between the glass envelope and the end of the post.

Socket 22 is of well known construction and has a center fixed contact which is exposed at the inner or upper end of cavity 21. At this end of the cavity is located position-responsive switch 26 which is provided with a pair of spaced conductors 27 and 28 (FIG. 4) which are exposed respectively on opposite sides of the switch body and are spaced apart within an internal cavity 26a in which is a body of mercury 29. The arrangement of the conductors 27 and 28 is such that when the switch is in the upright position, the level of the mercury is below the upper conductor 27, as shown in FIG. 4. However, when the dispenser is tilted substantially from the upright position, as for example to the position of FIG. 5, the mercury flows to the bottom of the switch cavity and bridges the gap between the two conductors 27 and 28, thus completing the circuit at this point. Typically, but not necessarily, the gap is bridged and the circuit closed only when the shaker has been tilted more than 90° from the upright position of FIG. 1 so that the light is on when the shaker approximately reaches the position of normal use.

Switch 26 preferably has a body of insulating material with one of the conductors, for example conductor 27, exposed externally at one side of the body and in a position to engage center contact 25 of the light socket. The other conductor of the switch 28 is also exposed externally at the other side of the switch body and in a position to be engaged by the center post of battery 30 when fully inserted in cavity 21. The switch is of a size to slide easily into cavity 21 and it is held therein by the battery. The switch is easily removable with the battery for necessary service.

For reasons which will become more evident, a mercury filled switch of this type is preferred as the position-responsive switch in the circuit means extending between the socket 22 and the battery receiving chamber 21 to energize the socket from battery 30, but it will likewise be evident that other types of switches or circuit closing means may be used, within the broad aspect of my invention.

In addition to the position-responsive switch described, the circuit means for energizing the socket and the light bulb therein includes conductor 32 connected at one end to the socket as shown in FIG. 2 and embedded within the post 20 which insulates the conductor both from battery 30 and salt 16. The lower end of conductor 32 is electrically connected to screw 34 which also serves as a means for pivotally mounting blade 36 on the under face of base 12. Screw 34 and blade 36 are metal and electrically connected to each other so that when the blade is swung into the position of FIG. 2 into contact with the end surface of battery 30, one branch of the electric circuit is completed from the battery through the blade and screw 34 to conductor 32 and thence to socket 22. Blade 36 thus not only serves as a portion of the electrical circuit for energizing the socket, but also as a means for holding battery 30 within cavity 21.

From the foregoing it will be understood that various modifications in the shape, arrangement and construction of the parts of my novel dispenser may be made by persons skilled in the art without departing from the spirit and scope of my invention. Accordingly, it is to be understood that the foregoing description is considered to be illustrative of, rather than limitative upon, the invention as defined by the appended claims.

I claim:

1. A shaker-type dispenser, comprising:
   a hollow body enclosing a space to contain a quantity of material to be dispensed, said body having a base on which the dispenser is adapted to rest in an upright position and a wall section at its upper end having perforations through which the material can be dispensed when the body is tilted toward an inverted position;
   a socket inside the upper portion of said body to receive a light and to position the light closely adjacent the perforated wall section;
   a battery-receiving chamber within the body;
   and circuit means to energize a light in said socket from a battery in said chamber including position-responsive switch means normally open when the dispenser is resting on said base and closing the circuit when the dispenser is tilted to dispensing position.

2. A shaker-type dispenser as in claim 1 in which the wall section adjoining the perforations is light transmissive.

3. A shaker-type dispenser, comprising:
   a body having an interior space to hold a quantity of material to be dispensed and a perforate wall section at its upper end provided with a plurality of perforations through which said material can be dispensed;
   said body also having a base on which the dispenser normally rests in an upright position with the perforate wall section above the level of material in said space;
   a hollow post inside the body open at its lower end and extending upwardly from the base to the upper portion of said interior space and adapted to hold a battery;
   a light bulb receiving socket mounted on the upper end of the post to position a light closely adjacent the perforate wall section;
   position-responsive switch means within said post electrically connected to said socket and also providing a fixed battery engaging contact interiorly of the post, said switch means being normally open when the dispenser is in its normal upright position and operating to close the circuit between said socket and said battery engaging contact when the dispenser is tilted toward an inverted position to dispense said material through said perforations;
   an electrical conductor embedded in the post and isolated thereby from the material within said interior space, said conductor extending between the socket and the base of the body;
   and a movable battery-engaging member mounted on the base and movable to a position connecting the conductor electrically to a battery and holding such battery within the post.

4. A shaker-type dispenser as in claim 3 in which the switch means is a separate unit removable from inside the post.

5. A shaker-type dispenser as in claim 3 in which the body wall is light transmissive in the vicinity of the perforate wall section.

6. A shaker-type dispenser, comprising:
   a hollow body enclosing a space to contain a quantity of material to be dispensed, said body being adapted to rest normally in an upright position and having at its upper end a light transmissive wall section provided with a plurality of perforations through which the material can be dispensed;
   a hollow member extending upwardly within said body from the bottom of said space to the upper portion of said space;
   a socket at the upper end of said hollow member to receive a light and to position the light closely adjacent said light transmissive wall section;
   said hollow member having a chamber opening at its lower end to the exterior of the body to receive a battery;
   and circuit means extending between the socket and the battery-receiving chamber to energize a light in the socket from a battery within the chamber.

7. A shaker-type dispenser, comprising:
   a hollow body enclosing a space to contain a quantity of material to be dispensed, said body being adapted to rest normally in an upright position and having at its upper end a light transmissive wall section provided with a plurality of perforations through which the material can be dispensed;
   a hollow member extending upwardly within said body from the bottom of said space to the upper portion of said space;
   a socket at the upper end of said hollow member to receive a light and to position the light closely adjacent said light transmissive wall section;
said hollow member having a chamber opening at its lower end to the exterior of the body to receive a battery;
and circuit means extending between the socket and the battery-receiving chamber to energize a light in the socket from a battery within the chamber;
said circuit means including a position-responsive switch means in the upper portion of the battery-receiving chamber, said switch means being normally open when the body is in its normal upright position and operating to close the energizing circuit when the body is tilted toward an inverted position to dispense said material through said perforations.

References Cited by the Examiner
UNITED STATES PATENTS

| | | | |
|---|---|---|---|
| 1,581,452 | 4/26 | Knebiel | 240—6.4 X |
| 2,280,457 | 4/42 | Sutcliffe | 240—6.4 |
| 2,931,539 | 4/60 | Maxey | 240—6.4 X |

FOREIGN PATENTS 505,644    5/20    France.

NORTON ANSHER, *Primary Examiner.*